Patented Apr. 7, 1942

2,278,549

UNITED STATES PATENT OFFICE 2,278,549

HYDROGENATION OF ACYL-SUBSTITUTED COMPOUNDS

Donald J. Loder, Wilmington, Del., assignor to E. I. du Pont de Nemours & Company, Wilmington, Del., a corporation of Delaware No Drawing. Application February 24, 1939, Serial No. 258,178

17 Claims. (Cl. 260—484)

This invention relates to a process for the hydrogenation of acyl-substituted aliphatic organic compounds and, more particularly, to the hydrogenation of the acyl group contained in the said compounds to an alcohol group.

The materials treated in accord with the process of this invention have the generic formula:

(1) 

wherein $R_1$ is a hydrogen hydroxy, alkyl, alkoxy, aryl, aryloxy, aralkyl or aralkyloxy group; $R_2$ is an acid group such as carboxyl, ester, acyl, nitrile or amide group; and $R_3$ is hydrogen or an alkyl, aryl, alkoxy alkyl, (alkoxy alkoxy) alkyl group. While the products obtained by hydrogenation have the generic formula:

(2) 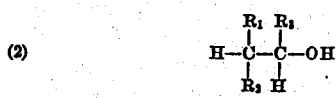

The functional groups in the $R_1$, $R_2$, or $R_3$ positions are the same as those given for the material treated. Broadly stated, the process involves hydrogenating a material having the Formula 1 to the product of Formula 2 wherein the carbonyl group has been converted to an alcohol group. More specifically, the invention relates to the hydrogenation of acyl-substituted alkyl acetates such as methyl methoxy formyl acetate, $CHO.CH(OCH_3)COOCH_3$, and methyl (methoxy methoxy) formyl acetate, $$CHOCH(OCH_2OCH_3)COOCH_3,$$

methyl (carbomethoxy dimethoxy) formyl acetate, $CHOCH(OCH_2OCH_2COOCH_3)COOCH_3$, 1.3 dioxolone 5 formyl,

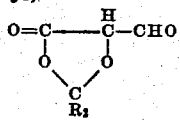

and 2.2 dimethyl 5 formyl 1.3 dioxol 4 one,

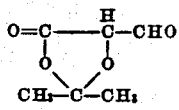

to obtain, respectively, as a result of the hydrogenation, alpha methyl ether of methyl glycerate, $CH_2OHCH(OCH_3)COOCH_3$, alpha (methoxy methoxy) ether of methyl glycerate, $$CH_2OHCH(OCH_2OCH_2COOCH_3)COOCH_3,$$

alpha carbo methoxy methoxy methyl ether of methyl glycerate, $$CH_2OHCH(OCH_2OCH_2COOCH_3)COOCH_3,$$

1.3 dioxolone 5 hydroxy methyl,

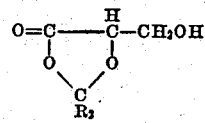

and 2.2 dimethyl 5 hydroxy methyl 1.3 dioxol 4 one,

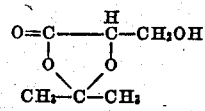

Objects of the invention are indicated by the above description of the invention, which broadly stated, provides a process for the hydrogenation of acyl-substituted aliphatic organic compounds for the preparation of compounds of like nature, wherein the acyl group has been replaced by an alcohol group. Another object of the invention is to provide a liquid phase process for the hydrogenation of formyl-substituted aliphatic organic compounds wherein the carbon atom adjacent to the formyl group is attached to an acid group such as carboxyl, ester, carbonyl, nitrile or amide group. A more specific object of the invention involves the preparation of ethers of alkyl glycerates by interacting acyl-substituted esters of alkoxy acetates with hydrogen in the presence of a suitable hydrogenation catalyst. Other objects and advantages of the invention will hereinafter appear.

The process of the present invention may be effected by the hydrogenation of the acyl-substituted compounds utilizing suitable hydrogenation catalysts therefor. The hydrogenation is conducted at atmospheric pressure or above, generally at pressures ranging between 5 and 1000 atmospheres and preferably between about 50C and 700 atmospheres, and at temperatures ranging between approximately 50 and 200° C. and preferably between 75 and 125° C.

Various methods may be used for carrying out the hydrogenation reaction, for example, the acyl-substituted compound, together with a suitable catalyst and an oxygenated organic solvent, e. g., methanol, ethanol, propanol and higher alcohols as well as ethers, esters, etc., may be placed in an autoclave provided with adequate stirring means and hydrogen pumped in to give the desired pressure. The autoclave and contents are then heated to temperature and with stirring the reaction is continued until the hydrogen absorption has substantially ceased.

The reaction proceeds in accord with the following equation:

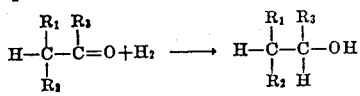

As has been indicated, $R_3$ designates a hydrogen, methyl or other functional group, which substitution renders the reactant an acyl-substituted compound such as formyl acetic acid, acetyl acetic acid and the like. By substituting in the $R_2$ position a carboxyl group or an ester group, there would result, for example, formyl acetic, formyl propionic, formyl butyric, or formyl isobutyric acids or higher formyl-substituted acids and their esters; an acyl group will give, methyl formyl ketone, $H_2C(CHO)COCH_3$; ethyl formyl ketone, $H_4C_2(CHO)COC_2H_5$, and the like; a nitrile group, formyl acetonitriles and formyl propionyl nitriles and the like; an amide group,—formyl acetamide, formyl propionamide and similar amides. By a substitution in the $R_1$ position by hydrogen, hydroxy, alkyl, alkyloxy or other functional groups, further modifications of the formyl-substituted compound are possible, but the substitutions indicated do not prevent the hydrogenation of the acyl group in accord with the invention to an alcohol group.

Various catalysts may be used for carrying out this process such, for example, as the fused, mixed metal oxide catalysts disclosed in the pending application of A. T. Larson, Serial No. 171,894, and filed October 30, 1938, and which describes copper catalysts promoted or unpromoted with one or more metal oxides. Other catalysts adaptable for the process are those that may be classified as hydrogenating metal catalysts or their oxides, which may be promoted by the presence of a more acidic metal oxide, especially where the more acidic metal oxide is chromium oxide as, for example, copper chromite. Any effective hydrogenating catalyst, however, may be used such, for example, as the nickel catalysts well known to the art.

The more detailed practice of the invention is illustrated by the following examples, in which parts are by weight unless otherwise stated. There are, of course, many forms of the invention other than these specific embodiments.

*Example 1.*—A high pressure shaker tube was charged with 143.4 parts of methyl formyl methoxy acetate, 86.04 parts of methanol, and approximately 20 parts of a nickel catalyst (the catalyst was prepared by precipitating nickel oxide on kieselguhr followed by reduction with hydrogen). The temperature of the tube and contents was raised to between 75 and 125° C. and hydrogen introduced to give a pressure of approximately 600 atmospheres. The reaction was continued until the absorption of hydrogen substantially ceased, whereupon the hydrogen pressure was released, the product distilled in vacuuo after first stripping off the methanol, and the product, alpha methyl ether of methyl glycerate was obtained in good yields. This compound is a water white liquid having a boiling point between 94° and 98° C. at 10 mm. pressure.

*Example 2.*—The process of Example 1 was repeated, using 71 parts of methyl (methoxy methoxy) formyl acetate, 71 parts of methanol, and the same type of catalyst that was used in Example 1. The temperature of the reaction was maintained at approximately 100° C. and the pressure at approximately 600 atmospheres. When the absorption of hydrogen substantially ceased, the hydrogen pressure was released, the product fractionated to remove methanol and methyl glycerate alpha (methoxy methoxy) ether (boiling point of 110° C. at 6 mm.) was recovered in good yields.

These products are useful as solvents for cellulose derivatives and as intermediates for the preparation of oxygenated organic compounds.

From a consideration of the above specification, it will be realized that many changes may be made in the conditions employed without departing from the scope of the invention or sacrificing any of the advantages that may be derived therefrom.

I claim:

1. A process which comprises hydrogenating to an alcohol group the $R_3C:O$ group of a substituted organic compound having the formula:

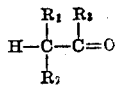

wherein $R_1$ is a radical of the group consisting of hydrogen, hydroxy, alkyl, alkoxy, aryl, and aryloxy groups; $R_2$ is a carboalkoxy group; and $R_3$ is a radical of the group consisting of hydrogen, alkyl and aryl groups, in the presence of a hydrogenation catalyst.

2. A process which comprises hydrogenating to an alcohol group in the liquid phase and in the presence of an oxygenated organic solvent an $R_3C:O$ group of a substituted organic compound having the formula:

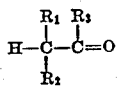

wherein $R_1$ is a radical of the group consisting of hydrogen, hydroxy, alkyl, alkoxy, aryl and aryloxy groups; $R_2$ is a carboalkoxy group; and $R_3$ is a radical of the group consisting of hydrogen, alkyl and aryl groups, in the presence of a hydrogenation catalyst.

3. The process of claim 2 conducted at a temperature between 50 and 200° C.

4. The process of claim 2 conducted at a pressure of 5 to 1000 atmospheres.

5. A process which comprises hydrogenating in the liquid phase and to an alcohol group the acyl group of an organic compound, the carbon atom adjacent to which is attached to an ester group in the presence of a hydrogenation catalyst.

6. The process of claim 5 conducted at a temperature between 50 and 200° C. and a pressure between 5 and 1000 atmospheres.

7. A process which comprises hydrogenating in the liquid phase the formyl group of an organic compound, the carbon atom adjacent to which is attached to a carboalkoxy radical to an alcohol group in the presence of a hydrogenation catalyst.

8. A process for the preparation of a substituted alpha alkyl ether of an ester of glyceric acid which comprises hydrogenating in the liquid phase an ester of an alpha acyl substituted glycolic acid in the presence of a hydrogenation catalyst.

9. A process for the preparation of an alpha alkyl ether of an alkyl glycerate which comprises hydrogenating in the liquid phase the formyl group of an alkyl formyl alkoxy acetic acid to an alcohol group in the presence of a hydrogenation catalyst.

10. A process for the preparation of alpha methyl ether of methyl glycerate which comprises hydrogenating in the liquid phase methyl formyl methoxy acetate in the presence of a hydrogenation catalyst at a temperature between 50 and 200° C. and at a pressure between 5 and 1000 atmospheres.

11. A process for the preparation of alpha (methoxy methoxy) ether of methyl glycerate which comprises hydrogenating methyl (methoxy methoxy) formyl acetate in the presence of a hydrogenation catalyst at a temperature between 50 and 200° C. and at a pressure between 5 and 1000 atmospheres.

12. A process for the preparation of an alpha alkyl ether of methyl glycerate which comprises hydrogenating an alkyl formyl alkoxy acetate in the presence of a hydrogenation catalyst at a temperature between 75 and 125° C. and at a pressure between 1 and 1000 atmospheres.

13. A process for the preparation of alpha methyl ether of methyl glycerate which comprises hydrogenating approximately 143 parts of methyl formyl methoxy acetate with approximately 86 parts of methanol in the presence of approximately 20 parts of a nickel hydrogenation catalyst, the reaction being conducted at a temperature between 75 and 125° C. and under a hydrogen pressure of approximately 600 atmospheres.

14. A process for the preparation of alpha (methoxy methoxy) ether of methyl glycerate which comprises hydrogenating approximately 71 parts of methyl (methoxy methoxy) formyl acetate dissolved in approximately 71 parts of methanol at a temperature of approximately 100° C. and under a pressure of approximately 600 atmospheres.

15. Alpha (alkoxy methoxy) ether of an alkyl glycerate.

16. Alpha (methoxy methoxy) ether of methyl glycerate.

17. Alpha methyl ether of methyl glycerate.

DONALD J. LODER.